United States Patent Office 3,442,948
Patented May 6, 1969

3,442,948
TERTIARY AMINOALKYL PHOSPHINE COMPOUNDS
Robert A. Wiley, Lawrence, Kans., assignor to Research Corporation, New York, N.Y., a non-profit corporation of New York
No Drawing. Filed Nov. 15, 1965, Ser. No. 507,698
Int. Cl. C07f 9/50; A61k 27/00
U.S. Cl. 260—570.5          7 Claims

ABSTRACT OF THE DISCLOSURE

Compounds of the formulae:

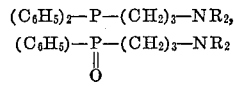

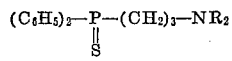

and $$(C_6H_5)_2-\underset{\underset{S}{\|}}{P}-(CH_2)_3-NR_2$$

wherein R is lower-alkyl have been prepared and found to possess CNS depressant activity.

---

This invention relates to novel tertiary phosphine compounds and to a process for making such compounds.

Tertiary phosphine compounds are organic compounds in which all three of the hydrogen atoms of phosphine have been replaced by hydrocarbyl radicals. Such compounds may be oxidized to the corresponding oxides or sulfides. I have discovered a novel class of amino-substituted tertiary phopshine compounds, and their oxides and sulfides, all of which exhibit central nervous systems depressant activity as determined by spontaneous activity reduction in test animals.

It is, therefore, an object of the present invention to provide novel pharmacologically useful tertiary phosphine compounds.

In accordance with the present invention, I have made available phosphine compounds of the formulae:

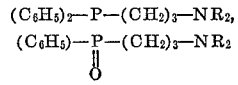

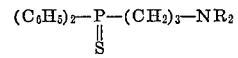

and $$(C_6H_5)_2-\underset{\underset{S}{\|}}{P}-(CH_2)_3-NR_2$$

wherein each R is a lower-alkyl group containing 1 to 4 carbon atoms inclusive, e.g., methyl, ethyl, propyl and butyl.

The phosphine compounds of the present invention are made by the reaction in the absence of air or moisture of lithium diphenylphosphine with the appropriate di-lower-alkylamino-propyl chloride as indicated in the equation below:

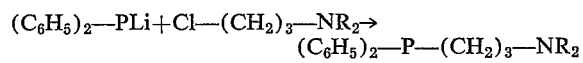

The resultant phosphine compounds are readily oxidized to the corresponding oxide or sulfide by means of a peracid, or sulfur and iodine, respectively.

The compounds of the present invention are weak bases due to the presence of an amino group on the propyl substituent. Acid addition salts can be prepared from the free bases in the conventional manner by reacting the free base with the usual inorganic acids, which include for the purposes of illustration, hydrochloric, hydrobromic, sulfuric and phosphoric acids; or an organic acid as, for example, acetic acid, tartaric acid, citric acid, et cetera. Such acid addition salts and the corresponding free bases are readily interconvertible, each to the other, and can be used in the isolation and preparation of the other. Both forms exhibit substantially the same pharmacological activity and the acid addition salts, as well as the free bases, fall within the scope of the appended claims.

My invention is further illustrated by means of the following examples.

Example 1

3-chloropropyldimethylamine.—The free base was liberated from its hydrochloride by dissolving 30.0 grams of the salt in 50 milliliters of water, covering the aqueous solution with 90 milliliters of toluene, and adding 7.60 grams of solid sodium hydroxide. The layers were shaken and separated, and the aqueous layer extracted twice with 30 milliliter portions of toluene. The combined toluene solutions were dried over sodium sulfate, the drying agent washed with 50 milliliters of toluene, and the combined solutions stored over molecular sieves. The concentration of the amine was determined by adding a portion of the toluene solution to excess water and quickly titrating the mixture with 0.1 N HCl.

Example 2

3-dimethylaminopropyldiphenylphosphine. — Manipulations with lithium were carried out in a moisture and oxygen-free atmosphere. The assembled glassware was evacuated and flushed with nitrogen and a small positive pressure of nitrogen maintained in the system by connecting the gas outlet to a glass U-tube partially filled with mercury.

A mixture of 2.10 grams of lithium ribbon, 26.8 grams of triphenylphosphine, and 200 milliliters of dry tetrahydrofuran was allowed to react in a nitrogen atmosphere at room temperature for 3 hours. After the cautious dropwise addition of 11.8 grams of tert-butyl chloride to destroy excess phenyl lithium, the mixture was heated to boiling for 10 minutes. The resultant red solution was cooled and transferred by means of a large syringe to a second nitrogen-filled apparatus. One hundred twenty-two milliliters of a 0.83 N solution of 3-chloropropyldimethylamine in toluene was added dropwise and the reaction mixture heated under reflux for 2 hours. After cooling, the reaction mixture was filtered through a sintered-glass disk and the solvents evaporated under reduced pressure. Fifty milliliters of benzene was added, and the resultant solution extracted with three 50 milliliter portions of 5% aqueous HCl. The aqueous extracts were combined, covered with 50 milliliters of benzene, and carefully made alkaline with concentrated aqueous sodium hydroxide. The layers were then shaken, separated and the aqueous layer extracted twice more with 50 milliliter portions of benzene. The combined benzene solutions were dried over sodium sulfate and the benzene evaporated leaving 20.0 grams of a residual yellow oil. Distillation of a portion of the material gave a fraction boiling with decomposition at 175–178° C. and 1.2 mm. of Hg. The product was purified by chromatography on alumina.

Example 3

3-dimethylaminopropylphosphine oxide.—To a solution of 6.0 grams of the phosphine of Example 2 in 50 milliliters of chloroform was added dropwise 4.5 grams of 3-chloroperbenzoic acid dissolved in 50 milliliters of chloroform and the solution stirred at room temperature for 2 hours. The reaction mixture was then extracted with 3 volumes of aqueous sodium hydroxide followed by extraction with 3 volumes of 5% aqueous HCl. The HCl extracts were combined, covered with 50 milliliters of benzene, and carefully made alkaline with concentrated aqueous sodium hydroxide. After shaking, the benzene was separated, the aqueous layer washed with two additional 50 milliliter portions of benzene and the combined benzene extracts evaporated at reduced pressure. The residual yellow oil was crystallized from petroleum ether to give 3.5 grams (56%) of hygroscopic white crystals, M.P. 87.5° C. in an evacuated sealed capillary.

*Analysis.*—Calcd. for $C_{17}H_{22}NOP$: C, 71.06; H, 7.72; N, 4.88; P, 10.78. Found: C, 71.19; H, 7.80; N, 4.70; P, 10.40.

Example 4

3-dimethylaminopropyldiphenylphosphine sulfide.—A mixture of 1.5 grams of the phosphine of Example 2, 0.53 gram of sulfur, 0.53 gram of iodine, and 10 milliliters of toluene was heated under reflux by means of an oil bath at 150° C. for 4 hours. (Although hydrogen sulfide was still being evolved after 4 hours, it was found that the yield of product remained the same when the reaction time was reduced to 1 hour.) The hot reaction mixture was poured onto a mixture of charcoal and diatomaceous earth. After cooling, the mixture was filtered and the residue washed with a small quantity of toluene. The combined toluene solutions were extracted with three 25 milliliter portions of 5% aqueous HCl. The combined HCl solutions were covered with 50 milliliter of benzene, and carefully made alkaline with concentrated aqueous sodium hydroxide. After shaking, the layers were separated and the aqueous fraction was extracted with three additional 50 milliliter portions of benzene. The benzene was evaporated at reduced pressure and the residual oil taken up in 30 milliliters of petroleum ether. On cooling, 800 milligrams (49%) of light yellow crystals were obtained, M.P. 78.5°.

*Analysis.*—Calcd. for $C_{17}H_{22}NPS$: C, 67.28; H, 7.32; N, 4.62. Found: C, 67.06; H, 7.24; N, 4.52.

All of the products were checked for homogeneity and identity by thin-layer chromatography carried out as follows: A 0.25 millimeter layer of aluminum oxide was deposited on glass plates, activated by heating at 125° for 30 minutes and allowed to cool in a desiccator. Spots representing 5 microliters of 10% solutions of each product in acetone were applied and the chromatograms developed spots were visualized by spraying with bromthymol blue. Aside from $R_f$ differences, characteristic gradations in the intensity of the spot produced by the bromthymol blue reaction were observed as tabulated below:

| Compound | $R_f$ | Intensity |
|---|---|---|
| 3-chloropropyldimethylamine | 0.84 | Light blue. |
| Phosphine (example 2) | 0.88 | Deep blue. |
| Oxide (example 3) | 0.26 | Light blue. |
| Sulfide (example 4) | 0.83 | Very deep blue. |

In addition to the expected fundamental bands, these substances exhibited what appear to be highly characteristic infrared absorptions. All three products show a strong, sharp peak near 1430 cm.$^{-1}$. Additionally the oxide possesses a very intense, broad band near 1180 cm.$^{-1}$, probably the P=O stretching frequency, and the sulfide shows a characteristic complex of seven intense bands between 690 and 810 cm.$^{-1}$.

The gross biological activity associated with these substances were determined. The results of acute toxicity studies are summarized below:

| Test compound | Dose, mg./kg. | No. of survivors/ total No. animals |
|---|---|---|
| Phosphine of example 2 | 500 | 0/2 |
|  | 100 | 0/2 |
|  | 50 | 1/2 |
| Oxide of example 3 | 500 | 0/2 |
|  | 100 | 2/2 |
|  | 50 | 2/2 |
| Sulfide of example 4 | 500 | 0/2 |
|  | 100 | 2/2 |
|  | 50 | 2/2 |

Despite the small number of test animals employed, it is apparent that a dose-related response is obtained with all three compounds. Observation of the animals indicated that death, where obtained, was due to central nervous systems depressions. All animals showed profound reduction in the level of spontaneous activity, accompanied in some cases by tremors and/or convulsions.

To determine whether reduction in spontaneous activity could be elicited at lower dose levels, studies were carried out in activity cages, using groups of two animals per cage. The cages were constructed such that an infrared beam passed twice diagonally through the cage. When an animal broke the light beam, a photoelectric cell activated a cumulative recorder. All animals survived the test and were observed for at least one hour. The results are summarized below:

| Test compound | Dose, mg./kg. | Activity, counts/min. Before drug | Activity, counts/min. After drug |
|---|---|---|---|
| Phosphine of example 2 | 10 | 3.3 | 0.34 |
|  | 25 | 2.4 | 0.6 |
| Oxide of example 3 | 100 | 4.7 | 1.1 |
| Sulfide of example 4 | 75 | 4.9 | 3.4 |

In another series of screening tests for central nervous system depressant activity, male Sprague-Dawley rats weighing about 300 grams were deprived of food until their weight had reached 80 percent of the pre-experiment level. They were then trained to press a lever in order to obtain, in a continuous reinforcement pattern, a small pellet of food. The number of times each rat pressed the lever during a 10-minute period carried out at about the same time daily was recorded. When the number of lever presses had reached a stable value (i.e., did not deviate by more than ten percent from previous mean values for three consecutive days), the animals were considered ready for drug testing. After the lever pressing sessions, animals were allowed access to normal laboratory food sufficient to maintain their weight. This required approximately 5 grams daily. This regimen was maintained daily during the course of the experiment.

Groups of five or six trained rats were used for testing each compound. One rat was injected intraperitoneally with normal saline solution and used as a control. The rest were injected in the same manner with appropriate doses of compounds to be tested, dissolved in normal saline which also contained 0.01 N HCl. Injections were carried out so that responses could be obtained at various time intervals after injection. All animals were allowed to recover for at least three days between injections.

The results obtained using 3-dimethylaminopropyldiphenylphosphine and 3-dimethylaminopropyldiphenylphosphine sulfide as the test compounds are summarized below. Dose rates are in milligrams per kilogram of body weight. The test results are expressed as percent depression of lever pressing activity.

| Time (min.) | Dose of 3-dimethylaminopropyldiphenylphosphine 0 mg./kg. | 16 mg./kg. | 20 mg./kg. |
|---|---|---|---|
| 15 | 0 | 70 | 74 |
| 30 | 0 | 20 | 57 |
| 60 | 0 | 12 | 27 |
| 120 | 0 |  | 14 |

| Time (min.) | Dose of 3-dimethylaminopropyldiphenylphosphine oxide 0 mg./kg. | 25 mg./kg. | 50 mg./kg. | 60 mg./kg. |
|---|---|---|---|---|
| 15 | 0 | 0 | 41 | 41 |
| 30 | 0 | 2.5 | 14 | 63 |
| 60 | 0 | 0 |  |  |
| 120 | 0 |  | 13 | 20 |
| 240 | 0 | 0 | 0 | 10 |

Contraction of the abdominal muscles at the injection site was observed with the 50 and 60 mg./kg. doses.

| Time (min.) | Dose of 3-dimethylaminopropyldiphenylphosphine sulfide | | | |
|---|---|---|---|---|
| | 0 mg./kg. | 15 mg./kg. | 25 mg./kg. | 50 mg./kg. |
| 15 | 0 | 22 | 52 | 91 |
| 30 | 0 | 6 | 28 | 92 |
| 60 | 0 | 0 | 20 | 58 |
| 120 | 0 | | 10 | 47 |

The work on which this application was based was financed in whole or in part by the Public Health Service.

I claim:
1. Compounds of the formulae:

$$(C_6H_5)_2-P-(CH_2)_3-NR_2,$$
$$(C_6H_5)_2-\underset{\underset{O}{\|}}{P}-(CH_2)_3-NR_2$$

or $$(C_6H_5)_2-\underset{\underset{S}{\|}}{P}-(CH_2)_3-NR_2$$

wherein R is lower-alkyl.

2. Compounds of the formula:

$$(C_6H_5)_2-P-(CH_2)_3-NR_2$$

wherein R is lower-alkyl.

3. Compounds of the formula:

$$(C_6H_5)_2-\underset{\underset{O}{\|}}{P}-(CH_2)_3-NR_2$$

wherein R is lower-alkyl.

4. Compounds of the formula:

$$(C_6H_5)_2-\underset{\underset{S}{\|}}{P}-(CH_2)_3-NR_2$$

wherein R is lower-alkyl.

5. 3-dimethylaminopropyldiphenylphosphine.
6. 3-dimethylaminopropyldiphenylphosphine oxide.
7. 3-dimethylaminopropyldiphenylphosphine sulfide.

References Cited

UNITED STATES PATENTS

| 3,055,798 | 9/1962 | Beriger | 260—970 XR |
| 3,242,236 | 3/1966 | Moedritzer | 260—970 |
| 3,253,033 | 5/1966 | Maier | 260—570.5 |

OTHER REFERENCES

Burger et al.: "Chemical Abstracts," vol. 56, p. 1534 (1962).

ROBERT V. HINES, *Primary Examiner.*

U.S. Cl. X.R.

260—501.1, 583, 606.5; 424—211